Patented Apr. 17, 1945

2,374,077

UNITED STATES PATENT OFFICE 2,374,077

RESINS OBTAINED FROM UREAS AND ALKYLOLAMINES

William James Burke, Wilmington, Del., assignor to E. I. du Pont de Nemours & Company, Wilmington, Del., a corporation of Delaware No Drawing. Application May 29, 1941,
Serial No. 395,879

10 Claims. (Cl. 260—70)

This invention relates to new compositions of matter and more particularly to resinous materials.

This invention has as an object the production of new and useful polymeric materials which contain basic amino nitrogen and which can be obtained from inexpensive readily available raw materials. A further object is a method for obtaining these polymeric and resinous materials. Other objects will appear hereinafter.

The above objects are accomplished by reacting in the manner more particularly pointed out hereinafter an N,N'-bis(alkoxymethyl)urea with an alkylolamine containing at least two hydroxyl groups, each of which is removed from the amino nitrogen by at least two carbon atoms, until at least one mole of alcohol has been eliminated per mole of N,N'-bis(alkoxymethyl)urea used.

Reactants of this kind are N,N'-bis(methoxymethyl)urea (O:C=(NHCH$_2$OCH$_3$)$_2$) and N-butyl-bis(beta-hydroxyethyl)-amine

The present products are of the probable general formula

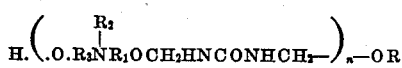

In the case of the particular reactants mentioned above R is CH$_3$ and in the recurring unit R$_1$ and R$_3$ are —CH$_2$CH$_2$—, and R$_2$ is —C$_4$H$_9$.

The above amines having two hydroxyl groups, each of which is at least two carbons removed from the amino nitrogen, are preferably tertiary amines since side reactions are thereby avoided and since these amines are readily prepared from primary amines and alkylene oxides. Aliphatic tertiary amines are preferred since they react more readily with the N,N'-bis(methoxymethyl)ureas than alkylolamines having aromatic substituents attached directly to the amino nitrogen, and the products are especially useful since they have a wider range of solubility and are more active acid acceptors than products containing aromatic amino groups. The N,N'-bis(alkoxymethyl)ureas containing less than 5 carbon atoms in the alkoxy group are preferred because these compounds, as compared to those having more than 5 carbon atoms in the alkoxy group, react more readily with the above mentioned amines and are more easily prepared.

In the usual method for carrying out the reaction, the N,N'-bis(alkoxymethyl)urea and the polyalkylolamine are added to the reactor, and the mixture is stirred and heated at 140°–190° C. until a product having the desired properties is obtained. Depending upon the type of polymer required, the heating is continued until at least one mole and not more than two moles of alcohol are liberated per mole of N,N'-bis-(alkoxymethyl)urea used. The alcohol by-product can be removed as it is formed but this removal is not necessary and for certain uses it is preferable to have the alcohol present in the final product. The course of the reaction can be followed by determining the amount of alcohol formed.

It is sometimes desirable but not necessary to pass air or nitrogen over or through the reaction mixture so that the alcohol by-product is readily removed as it is formed. The alcohol liberated depends upon the particular N,N'-bis-(alkoxymethyl)urea used; thus, with N,N'-bis-(methoxymethyl)urea and N,N'-bis(butoxymethyl)urea, methanol and butanol, respectively, are formed. The addition of a solvent in certain cases facilitates the formation of a uniform product but this is not essential.

In order to avoid the formation of low molecular weight products the molar ratio of the urea derivative to the alkylolamine should not be substantially lower than 0.7. The products having most desirable properties are those obtained by reacting substantially equimolar proportions of an N,N'-bis(alkoxymethyl)urea and an aliphatic tertiary amine containing two beta-hydroxyethyl groups attached to the nitrogen until at least 1.6 moles of methanol are formed. Properties which make these preferred products especially valuable include (1) ease and extent of solubility in a wide variety of solvents, (2) freedom from objectionable color, (3) superior acid accepting ability, and (4) excellent stability.

The reaction temperatures should be below that which brings about undesirable decomposition with the particular reactants used, usually from 200° to 220° C. At temperatures below 100° C. the time of reaction becomes too long to be practical. In general, resin formation proceeds readily between 140° and 190° C. and there is little or no discoloration of the product under these conditions. In certain instances the reaction time can be shortened by blowing nitrogen or air over or through the reaction mixture since this assists in removing the alcohol formed during the process. The time required for the completion of the reaction varies from ½ to 5 hours or more depending upon the particular reactants and the quantities used, the temperature and the degree of polymerization desired. Super or subatmospheric pressures can be employed but, in general, atmospheric pressure gives satisfactory results.

The following examples in which the parts are by weight are further illustrative of the practice of this invention.

*Example I*

One hundred seventy-one parts of N-butyl-bis(beta-hydroxyethyl)amine and 148 parts of N,N'-bis(methoxymethyl)urea (molecular weight, 148) are added to a reactor equipped with an efficient stirring device. A slow stream of nitrogen is passed through the reactor and the contents are stirred and heated at 150° to 160° C. for about 1.5 hours. Fifty-six parts of methanol are liberated during the heating process. The product is a clear, light-yellow resin which is completely soluble in trichloroethylene, ethanol, and dilute hydrochloric and acetic acids. The resin is precipitated by the addition of alkali to the acid solutions. Flowouts of a trichloroethylene solution of the resin containing 1% phosphorous pentoxide when baked two hours at 127° C. give hard clear films which do not become white upon soaking in water.

When the above reaction is repeated using 120 parts of dimethylolurea (molecular weight, 120) in place of 148 parts of N,N'-bis(methoxymethyl) urea the resulting product is an opaque viscous mass which is not soluble in ethanol, trichloroethylene or hydrochloric acid.

*Example II*

One hundred eighty-one parts of N-phenyl-bis (beta-hydroxyethyl)amine, 148 parts of N,N'-bis(methoxymethyl)urea, and 32 parts of methanol are added to a reactor similar to that described in Example I. The reaction mixture is gradually heated up to 180° C. and in the course of about two hours 83 parts of methanol is evolved. The light-brown solid product is soluble in dilute hydrochloric acid.

*Example III*

One hundred forty-eight parts of N,N'-bis (methoxymethyl)urea, 105 parts of 2-amino-2-methylpropanediol-1,3 and 32 parts of methanol are added to a reactor. A stream of nitrogen is passed over the reaction mixture which is stirred vigorously and heated slowly up to 100° C. over a period of about 10 minutes during which time a clear solution is obtained. The bath is gradually heated up to 150° C. and maintained at 150° to 180° C. for about 40 minutes during which time about 96 parts of methanol is liberated. The product is a light-brown transparent viscous mass which is readily soluble in dilute hydrochloric and acetic acids and aqueous ethanol.

The present process is most advantageously carried out with N,N'-bis(methoxymethyl)urea since methanol is liberated which can be removed easily. This compound also reacts more readily with alkylolamines and is readily prepared.

Examples of additional N,N'-bis(alkoxymethyl) ureas from which the products of this invention are obtained include such compounds as N,N'-bis (ethoxymethyl)urea (OC(NHCH$_2$OC$_2$H$_5$)$_2$); N-methoxymethyl-N'-ethoxymethyl urea (CH$_3$OCH$_2$NHCONHCH$_2$OC$_2$H$_5$)

N,N'-bis(butoxymethyl)urea (OC(NHCOCH$_2$OC$_4$H$_9$)$_2$)

N,N'-bis(lauroxymethyl)urea (OC(NHCOCH$_2$OC$_{12}$H$_{25}$)$_2$)

and N,N'-bis(ethoxyethoxymethyl)urea (OC(NHCH$_2$OCH$_2$CH$_2$OC$_2$H$_5$)$_2$)

Other alkylolamines which can be used instead of those previously mentioned comprise a large number of available compounds, examples of which are N-methyl-bis((beta-hydroxyethyl) amine, N-dodecyl-bis(beta-hydroxyethyl)amine, N-cyclohexyl-bis(beta-hydroxyethyl)amine, N-furfuryl-bis(beta-hydroxyethyl)amine, N-methyl-bis(2-hydroxypropyl)amine, bis- (beta-hydroxyethyl)amine, tri - (beta - hydroxyethyl) amine, 2-amino-2-isopropylpropanediol-1,3 and trimethylolaminomethane.

Products having the desired solubilites can be obtained by the proper choice of alkylolamine. Thus, the use of alkylolamines having a high carbon content such as N'-hexyl-or N'-dodecyl-bis (beta-hydroxyethyl)amines give rise to hydrocarbon soluble products which are especially valuable in applications requiring water resistant materials. When the utility of the product depends primarily upon its solubility in water or upon its acid accepting properties, a low molecular weight alkylolamine such as N-methyl-bis(beta-hydroxyethyl)amine is used. If it is so desired, more than one N,N'-bis(alkoxymethyl)urea and more than one alkylolamine can be used in the preparation of these polymeric products.

The reactants can be added to the reactor in any order and it is desirable, although not essential, that the mixture be efficiently stirred throughout the course of the reaction. A uniform product is more readily obtained in certain instances by adding one or more solvents to the reactor so that a homogeneous reaction system is obtained before any appreciable reaction takes place. Particularly good results can be obtained using solvents such as methanol, chloroform, benzene, dioxane, xylene, bis-(methoxyethyl) ether and dibutylether. The choice of solvent in any specific case depends upon the solubility of the reactants and, in general, the minimum amount of solvent necessary to produce a homogeneous reaction system is preferred.

The basic polymeric products obtained by the practice of this invention vary from light-colored transparent viscous liquids to solids depending upon the nature and quantity of reactants, and the reaction conditions used. The products are soluble in dilute aqueous acids and in organic solvents. Flow-outs of the resins from solutions particularly in the presence of an acidic catalyst set up upon baking to give clear, hard, glossy, light-colored films.

The new polymeric materials described herein are useful as stabilizers for isomerized rubbers, pesticides, anti-fume agents for certain dyestuffs in cellulose acetate, plasticizers, and as film-forming compositions.

As many apparently widely differing embodiments of this invention may be made without departing from the spirit and scope thereof, it is to be understood that I do not limit myself to the specific embodiments thereof except as defined in the appended claims.

I claim:

1. A process for making a polymeric product which contains basic amino nitrogen and which is soluble in dilute acid, said process comprising heating to reaction temperature an N,N'-bis-(alkoxymethyl)urea and an alkylolamine containing at least two and not more than three hydroxyl groups each of which is removed from the amino nitrogen by at least two carbon atoms, said urea and alkylolamine being present in the proportion of from at least 0.7 mole to one mole of the urea for each mole of the alkylolamine, and continuing the reaction until at least one mole and not more than two moles of alcohol has been eliminated for each mole of said urea.

2. The process set forth in claim 1 in which said alkylolamine is a tertiary amine.

3. The process set forth in claim 1 in which said urea is N,N'-bis(methoxymethyl)urea.

4. A process for making a polymeric product which contains basic amino nitrogen and which is soluble in dilute acid, said process comprising heating to reaction temperature substantially equimolecular proportions of an N,N'-bis(alkoxymethyl)urea and a tertiary amine containing two beta-hydroxyethyl groups attached to nitrogen, and continuing the heating until at least 1.6 moles and not more than two moles of alcohol are formed.

5. The process set forth in claim 1 in which said heating is at a temperature of 140° to 190° C.

6. The process set forth in claim 1 in which said alkylolamine is an aliphatic tertiary alkylolamine containing two beta-hydroxyethyl groups attached to nitrogen.

7. A polymeric material which is soluble in dilute hydrochloric acid, which yields hard films, and which is the product obtained by heating to reaction temperature an N,N'-bis(alkoxymethyl)urea and an alkylolamine in the proportion of from at least 0.7 mol to one mol of the urea for each mol of the alkylolamine until substantially more than one mol and not more than two mols of alcohol have been eliminated for each mol of said urea, said alkylolamine containing at least two and not more than three hydroxyl groups, each of which is removed from the amino nitrogen by at least two carbon atoms.

8. A polymeric material which is soluble in dilute hydrochloric acid, which yields hard films, and which is the product obtained by heating to reaction temperature substantially equimolecular proportions of N,N'-bis-(methoxymethyl)-urea and an alkylolamine until substantially more than one mol and not more than two mols of alcohol have been eliminated from said urea, said alkylolamine containing at least two and not more than three hydroxyl groups, each of which is removed from the amino nitrogen by at least two carbon atoms.

9. The product set forth in claim 7 in which said alkylolamine is a tertiary amine.

10. The product set forth in claim 7 in which said N,N'-bis-(alkoxymethyl)urea is N,N'-bis-(methoxymethyl)urea and in which the alkylolamine is a tertiary amine having two hydroxyl groups.

WILLIAM JAMES BURKE.